(12) United States Patent
Biancucci et al.

(10) Patent No.: US 9,271,541 B2
(45) Date of Patent: Mar. 1, 2016

(54) SOLE FOR SHOES HAVING ONE OR MORE VERTICAL ELEMENTS FOLDED OVER EACH OTHER, EXTENSIBLE AND ADAPTABLE TO THE DIFFERENT WIDTH OF THE ASSEMBLY LAST OF THE UPPER AND TO THE VARIATION OF THE CONFORMATION OF THE FOOT, EVEN PERMANENTLY

(75) Inventors: Demetrio Biancucci, Civitanova Marche (IT); Alfredo Brasca, Civitanova Marche (IT)

(73) Assignee: AL.PI. S.R.L., Civitanova Marche (MC) (IT)

( * ) Notice: Subject to any disclaimer, the term of this patent is extended or adjusted under 35 U.S.C. 154(b) by 369 days.

(21) Appl. No.: 13/825,914

(22) PCT Filed: May 9, 2011

(86) PCT No.: PCT/EP2011/002285
§ 371 (c)(1),
(2), (4) Date: Mar. 25, 2013

(87) PCT Pub. No.: WO2012/059142
PCT Pub. Date: May 10, 2012

(65) Prior Publication Data
US 2013/0185956 A1    Jul. 25, 2013

(30) Foreign Application Priority Data

Nov. 4, 2010    (IT) .............................. AN2010A0193

(51) Int. Cl.
*A43B 13/02*    (2006.01)
*A43B 3/26*    (2006.01)
(Continued)

(52) U.S. Cl.
CPC . *A43B 13/02* (2013.01); *A43B 3/26* (2013.01); *A43B 13/16* (2013.01); *B29D 35/061* (2013.01); *B29D 35/10* (2013.01); *A43B 13/12* (2013.01)

(58) Field of Classification Search
CPC ............ A43B 3/00; A43B 3/26; A43B 13/00; A43B 13/14; A43B 13/141; A43B 13/42; A43B 13/16; A43B 13/02; A43B 13/12; A43B 13/023
USPC .......................................... 36/28, 103, 102, 97
See application file for complete search history.

(56) References Cited

U.S. PATENT DOCUMENTS 3,748,756 A * 7/1973 White ................................ 36/97
4,309,832 A * 1/1982 Hunt ............................. 36/32 R
(Continued)

FOREIGN PATENT DOCUMENTS

GB       2092431 A   *   8/1982

*Primary Examiner* — Jila M Mohandesi
(74) *Attorney, Agent, or Firm* — Egbert Law Offices, PLLC

(57) ABSTRACT

A sole is provided in a single-moulding made of non-rigid but elastic material having one or more vertical elements folded over each other in such a manner that the horizontal extension thereof mechanically adapts the width of the sole to the different width of the assembly lasts of the upper of a shoe. This also allows adapting the width of the sole to the variation of the conformation of the feet generated by the daily swellings thereof leaving the normal flexibility and comfort of the shoe unaltered. The user may stabilize the width of the sole to the possible deformation of the foot by injecting, from outside into the widened internal cavity, a foamed two-component fluid material which, upon solidification within a few minutes, blocks any widened part of the sole to the conformation or to the deformation of the feet of the user.

10 Claims, 5 Drawing Sheets

(51) Int. Cl.
*A43B 13/16* (2006.01)
*B29D 35/06* (2010.01)
*B29D 35/10* (2010.01)
*A43B 13/12* (2006.01)

(56) References Cited

U.S. PATENT DOCUMENTS

| | | | | |
|---|---|---|---|---|
| 5,768,802 A | * | 6/1998 | Bramani | A43B 7/146 36/28 |
| 6,065,230 A | * | 5/2000 | James | 36/25 R |
| 6,920,707 B1 | * | 7/2005 | Greene et al. | 36/97 |
| 7,155,845 B2 | * | 1/2007 | Durand | 36/97 |
| 7,168,190 B1 | * | 1/2007 | Gillespie | A43B 3/24 36/102 |
| 7,290,357 B2 | * | 11/2007 | McDonald | A43B 3/0057 36/102 |
| 7,634,861 B2 | * | 12/2009 | Kilgore | 36/97 |
| 7,814,686 B2 | * | 10/2010 | Becker | A43B 13/026 36/102 |
| 7,946,058 B2 | * | 5/2011 | Johnson | A43B 3/0057 36/102 |
| 8,656,613 B2 | * | 2/2014 | Stockbridge et al. | 36/102 |
| 2002/0088145 A1 | * | 7/2002 | Clark et al. | 36/97 |
| 2005/0257405 A1 | * | 11/2005 | Kilgore | 36/97 |

* cited by examiner

Fig. 6
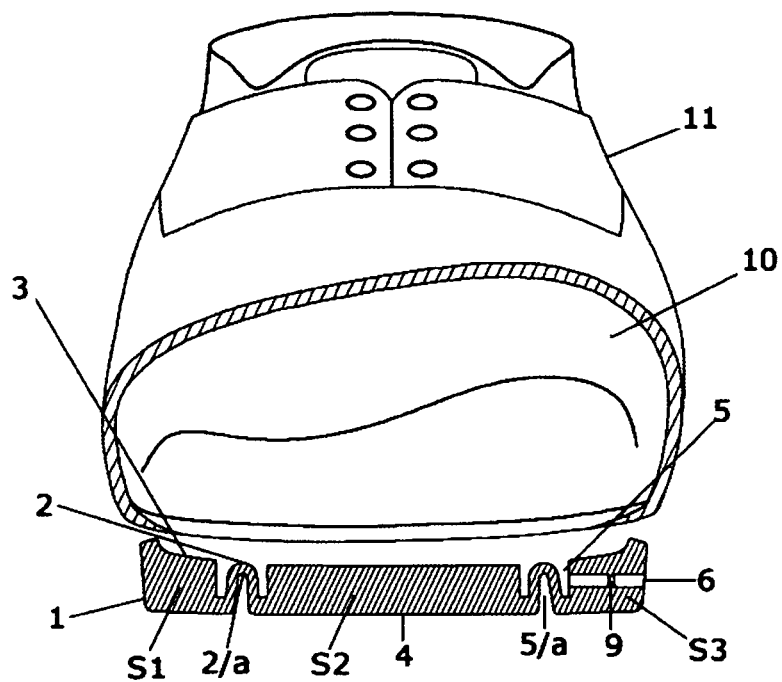
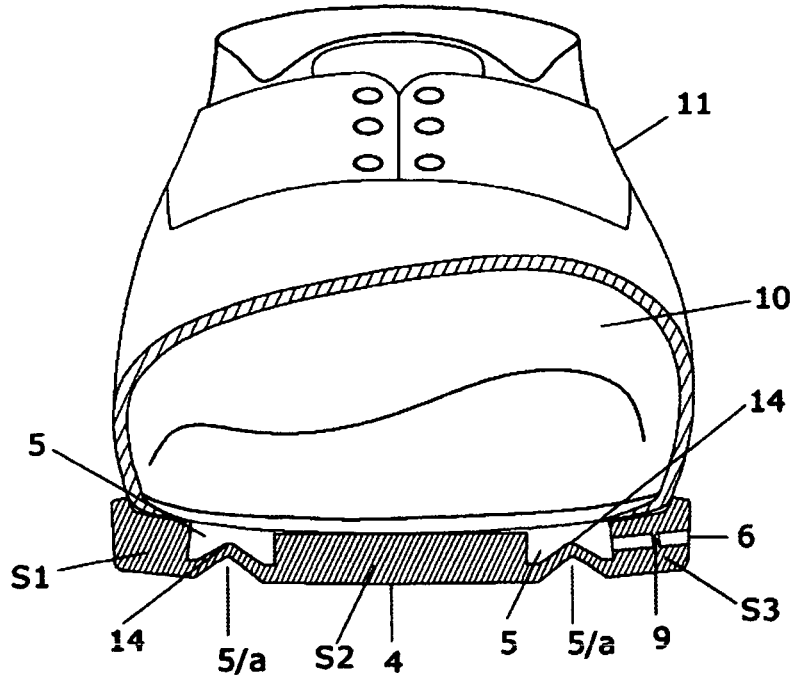
Fig. 7

SOLE FOR SHOES HAVING ONE OR MORE VERTICAL ELEMENTS FOLDED OVER EACH OTHER, EXTENSIBLE AND ADAPTABLE TO THE DIFFERENT WIDTH OF THE ASSEMBLY LAST OF THE UPPER AND TO THE VARIATION OF THE CONFORMATION OF THE FOOT, EVEN PERMANENTLY

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention regards the shoe industry and more specifically it concerns a sole provided in a single moulding made of non-rigid but elastic material having one or more vertical elements folded over each other in such a manner that the horizontal extension thereof mechanically adapts the width of the sole, to the different width of the assembly lasts of the upper of a shoe and also allowing adapting the width of the sole to the variation of the conformation of the feet, generated by the daily swellings thereof leaving the normal flexibility and comfort of the shoe unaltered with the possibility for the user to stabilize the width of the sole to the possible deformation of the foot by injecting—from outside into the widened internal cavity—a foamed two-component fluid material which, upon solidification within a few minutes, blocks any widened pan of the sole to the conformation or to the deformation of the feet of the user.

2. Description of Related Art Including Information Disclosed Under 37 CFR 1.97 and 37 CFR 1.98.

Used in the construction of a shoe are assembly lasts having lengths for predetermined sizes with the general effect that the user can select—on the market—shoes that are suitable for the length of the feet thereof hut not always suitable to the transverse width of the same.

This leads to clear discomfort for the user even due to the known fact that the width of the human foot never has a clearly determined ratio with the length thereof and that the morphology of the right foot of a person is generally different from the left foot thereof, leading to the fact, that the shoe made using identical assembly lasts for both feet may perfectly adapt to the right foot but not to the left foot or vice versa.

It is known that the feet are subjected to daily swellings due to different reasons, hence the possibility of simultaneously adapting the upper and the sole to the variable conformation thereof makes the shoe much more comfortable.

Furthermore, there currently arises technical and aesthetic-needs which require assembly lasts of the shoe having, different lengths of the plantar arch of the sole and/or of the sole which require soles having the width of the gluing base compatible with those of the former, hence leading to the shoe makers making as many sole moulds as the various widths of the assembly lasts, with the ensuing increase of the costs of production of the shoe.

Currently, there are various patents providing for adapting the shoe to the conformation of the foot and to the possible deformations thereof.

The Italian patent under application No. BO2002A000816 dated Mar. 22, 2004, having the title "*A method for producing shoes and a shoe obtained by this method*", describes and claims a process for making a shoe adaptable—in width—to the conformation or deformation of the foot of the user, consisting in fixing the upper to the sole at some predetermined points and introducing—into the interspace left vacant—a transversely-extensible, elastic band when the shoe is fitted so as to adapt the upper to the conformation or deformation of the foot of the user.

The above mentioned patent reveals the drawback lying in the fact that the stabilization of the adaptation of the sole to the conformation of the foot as described and claimed therein requires a subsequent gluing of the unglued interpsaces of the upper to the sole and the milling of the initial greater width of the sole with respect to that of the upper to actually adapt it to the width of the foot of the user.

The patent under application No. PCT/FR/02/01366 dated Apr. 22, 2002 extended in the US under U.S. Pat. No. 7,155,845 B2 having the title "*Sole with extensible structure footwear equipped with same and method for mounting same*" describes and claims the structure of a sole whose transverse extension is obtained through insertion—by means of moulding or gluing—of a deformable insert into the sole base made of shape memory elastic material provided with—in the underlying part thereof—one or more lugs countersunk in corresponding openings of the base sole.

A similar solution was also applied by the patent under application No. PCT/ES/05/0000018 of the Jan. 14, 2005 on behalf of Hergar claiming the priority rights of the Spanish patent No. ES U 2004736 dated Mar. 25, 2004 having the title "*Calcado e sola ergonomicos auto-ventildos*" whose adaptation of the shoe and of the sole to the conformation of the foot of the user is determined by a series of parallel longitudinal grooves arranged staggered with respect to the others at the level of the sole so as to obtain a structure of the bellow type which allows a transverse elastic, deformation of the sole also facilitated by an elastic body inserted into an insole.

The US patent No. 2005/0210710 A1 having the title "*Footwear system having a sole adaptable to different dimensions of shoes*" describes and claims a system of two soles of different dimensions the second of which is adaptable to the dimensions of the first and it is provided with a hollow part so as to be able to adapt to the dimension of the second sole.

More recently, the problem regarding the adaptability of the shoe to the conformation or deformations of the foot of the user was addressed by the patent under application No. PCT/IT-2005/000071 having the title "*Shoe having an inner adaptable surface on which the wearer's foot rests*" wherein the adaptability of the shoe to the various conformations of the foot of the user was resolved by providing the sole with an insole provided in a first step-made of rubber material and provided in which is a perpendicular and truck-shaped groove introduced into which is the more elastic material which, in a second step, due to the pressure exerted by the foot, overflows from such trunk-shape leading to the adjustment of the shape of the shoe to the conformation of the foot of the user.

Another solution for the adaptability of the shoe to the conformation of the foot of the user was described and claimed in patent US 2007/0039208 A1 having the title "*Adaptable shoe having art expandable sole assembly*" which, besides providing for the insertion of elastic elements into the upper of the shoe to adapt it to the conformation of the foot, it describes and claims a system which also makes the sole extensible—in width—to adapt it to the width of the upper by using an intermediate sole made of soft material and housed in the external sole; said intermediate sole is provided with cavities on the front and central parts of the sole intended to house the elements which facilitate the transverse extension due to the pressure of the sole adapting it to the conformation of the foot of the user.

Said patent expressly refers [0055 page 5] to the solution described and claimed in patent WO 2006/087737 A1 having the title "*Shoe-with adjustable sole*" which describes and claims a sole inserted into which are stiff elements alternated with deformable elements which, selected by the user when buying the shoe according to the conformation to the feet thereof cause the widening of the sole and of the shoe to suit the needs thereof.

Though said system allows providing a shoe whose dimensions match the conformation of the foot of the user, they reveal the drawback lying in that the presence of stiff elements within the shoe make it not perfectly fitting and limit flexibility thereof with the ensuing effect of making it uncomfortable.

Another drawback of the solution subject of the application PCX WO 2006/087737 regards the need, of providing—for each pair of shoes—a plurality of innersoles having stiff elements of various shapes and dimensions to offer to the buyers, with the ensuing negative effect of increasing the cost of production of the shoe.

All the devices described above base the transverse adaptability effect of the upper or of the sole of a shoe on the insertion, of more or less stiff stabilising elements which have the drawback of limiting and reducing the flexibility of the shoe.

On the contrary, in the invention described and claimed with the present application, the adaptation of the width of the sole to the upper occurs mechanically in the gluing step thereof and subsequently automatically due to the pressure exerted onto the upper and onto the sole by the variation of the conformation or by the deformation of the foot, the term "mechanical" widening being used to indicate, the movement—in horizontal line—determined by the pressure of the step of gluing the sole to the upper inserted to the assembly last thereof; and the term "automatic" widening of the sole is used to indicate the movement—in horizontal line—caused by pressure and by the variation of the conformation of the foot following the swelling thereof or by the deformation thereof.

The injection of a foamed two-component fluid material into an internal cavity of the sole widened by extending the vertical folded elements is provide for should the user want to permanently stabilise the width of the sole to the shoe, with the aim of keeping the degree of flexibility of the shoe unaltered and improving comfort thereof.

The comfort of the shoe that shall adapt the sole subject of the present application is ensured by the further advantage lying in the fact that the user thereof has a shoe whose sole and upper automatically adapt to the daily variable swelling of the foot thereof.

Lastly the present invention differs from the above mentioned patents due to the feet that it meets the needs of shoe makers and of the end consumer in that, by allowing the shoe makers to use a sole adaptable to the different, widths of the assembly lasts, it determines economies of cost of the production process and provides the user with a more comfortable and flexible shoe with respect to those currently available in the market.

BRIEF SUMMARY OF THE INVENTION

An object of the present, invention is that of overcoming the aforementioned drawbacks by proposing a moulded sole made of non-rigid but elastic material, such as elastomers, polyurethanes, rubber, thermoplastic, etc having one or more vertical elements folded over each other located in the internal cavity which traverses the entire sole so that the horizontal extension of said vertical elements mechanically determines the width of the sole during the step of assembly adapting it to the different widths of the assembly last and before it is removed from the upper.

Another object of the present invention is that of allowing the user to automatically adapt the width of the sole and of the shoe to the variation of the conformation of the feet thereof caused by the daily swelling thereof so as to make it much more comfortable.

Another object of the present invention is that of allowing the user to permanently adapt the width of the sole and of the shoe to the conformation or deformation of the feet thereof.

Another object of the present invention is that of providing the users, whether consumers or shoe makers, with a sole having improved characteristics with respect to those currently available in the market, due to the tact that besides perfectly adapting—during the gluing step—to the various widths of the assembly lasts, it does not deform the finished shoe due to the elastic memory said sole is provided with.

Another object of the present invention is that of providing the user with a sole adaptable to the width of the assembly lasts inserted in the upper or to the conformation of the feet thereof without jeopardising the flexibility of the shoe on which it is mounted.

Lastly, an object of the present invention is that of providing shoe makers with a sole adaptable to the various widths of the assembly lasts, with the ensuing economies of the production process.

These and other objects are attained by the invention subject of the present application regarding a sole provided in a single moulding made of non-rigid but elastic material provided with one or more vertical elements folded over each other located in an internal cavity having the characteristic of extending mechanically due to the pressure caused by the gluing of the sole to the upper so as to adapt the width of each zone of the gluing base of the sole to the different width of the assembly last inserted into the tipper and allowing the user to automatically adapt also the width of the sole due to the pressure exerted onto the upper by the variation of the conformation of the foot due to possible daily swelling variables thereof which determine the extension of said vertical elements of the sole, all this being attained keeping the degree of flexibility of the shoe on which said sole is mounted unaltered and allowing the user to wear and subsequently permanently stabilise the width of the sole to the conformation or deformation of the feet thereof by injecting—from outside into the widened internal cavity—a foamed two-component liquid which, upon solidification within a few minutes, blocks the extension of said elements and the widening of the internal cavity that contains them.

BRIEF DESCRIPTION OF THE DRAWINGS

Further characteristics and advantages of the invention shall be clearer from the description of a preferred but non-exclusive embodiment of the present application, illustrated byway of a non-limiting example in the attached drawings wherein:

FIG. 6 and FIG. 7 show the succession of the mechanical widening, which occurs when gluing the sole (1) to the upper (11) inserted in the assembly last (10), where FIG. 6 shows, before gluing thereof, the upper (11) inserted in the assembly last (10) and the sole (1) with the gluing base (3) thereof the vertical elements (2) folded over each other of the internal cavity (5) and the concave parts (2/a) thereof of the external cavity (5/a); and FIG. 7 shows the step of gluing the sole (1) to the upper (11) inserted in the assembly last (10) and, in particular, the horizontal mechanical extension of the extended vertical elements (14) in the widened internal cavity (5) so as to adapt the width of the sole (1) to that of the assembly last (10) inserted in the upper (11).

DETAILED DESCRIPTION OF THE INVENTION

Figure 1:
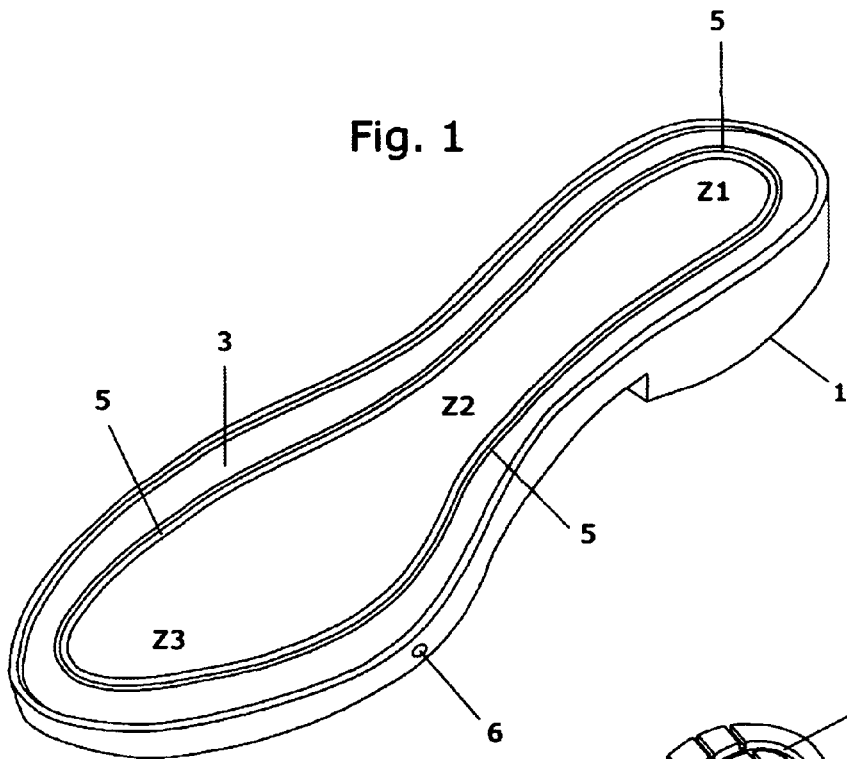
FIG. 1 is an axonometric representation of the sole (1) seen from above from the internal part with the gluing base (3), the heel zone (Z/1), the plantar arch zone (Z/2) and the sole zone (Z/3) traversed by the internal cavity (5)
Figure 2:
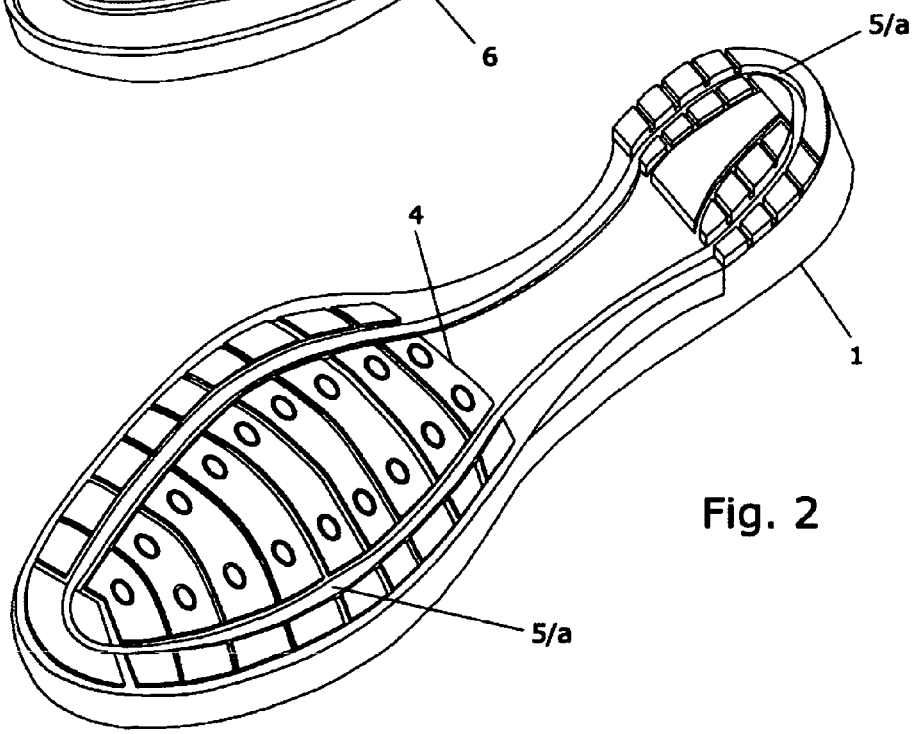
FIG. 2 is a representation similar to the preceding one from the side of the head (4) of the sole (1) with the external cavity (5/a) thereof.

The object of the present invention regards a moulded sole (1) made of non-rigid and elastic material such as elastomers, polyurethanes, rubber, thermoplastic characterized by one or more vertical elements (2) folded, over each other made of extremely elastic material extensible and positioned in the internal cavity (5) near the gluing base (3) of the sole (1) corresponding—from the tread or external part (4) of the sole (1)—to the external, cavity (5/a) provided with two concave parts (2/a) of the folded vertical elements (2).

The pressure that is generated in the gluing between the sole (1) and the assembly last (10) inserted in the upper (11) determines a mechanical widening of the folded vertical (2) and concave (2/a) elements [shown as extended elements with (14)] which in turn generates the widening of the internal (5) and external (5/a) cavity of the sole (1) and in particular of the gluing base (3) thereof and simultaneously of the tread part (4) thereof adapting—by means of lateral mechanical motion—the width of the gluing base (3) to the width of the assembly last (10) inserted, in the upper (11).

Said vertical elements (2) folded over each other and the corresponding concave elements (2/a) are made of extremely elastic material—the term "elastic" being used to indicate the property of said vertical elements (2) folded over each other and concave elements (2/a) to deform into extended elements (14) depending on the action of various forces and recovering the initial shape and dimensions once such forces cease—and respectively the folded vertical elements (2) are positioned in the internal cavity (5) and the corresponding concave elements (2/a) are positioned in the external cavity (5/a) of the tread part of the sole (1).

Figure 3:
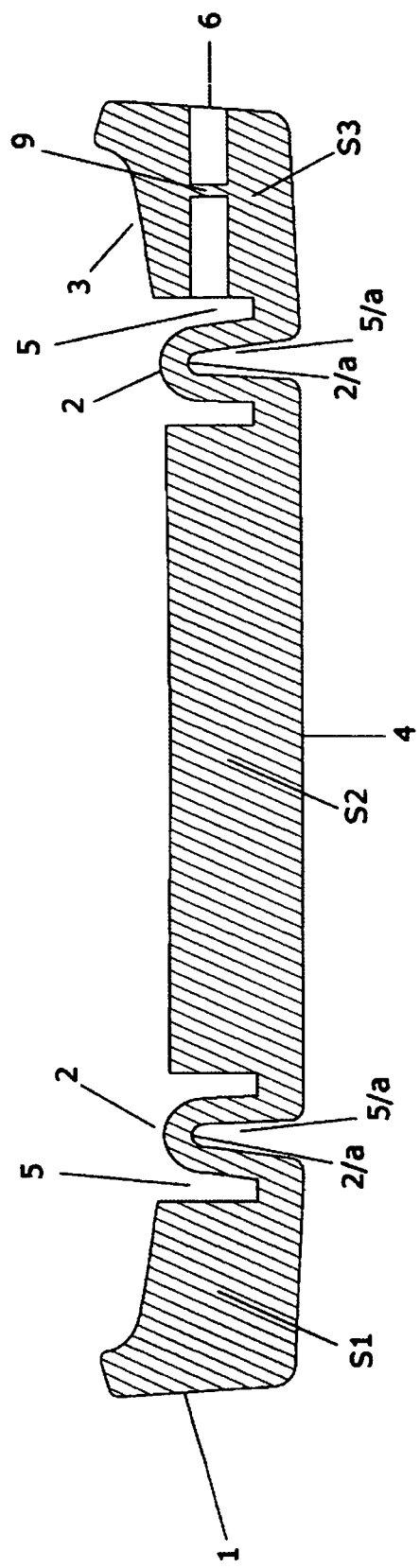
FIG. 3 is an axonometric representation—in front section—of the detail of the folded vertical elements (2) of the internal cavity (5) and of the concave elements (2/a) located in the external cavity (5/a) adjacent to the gluing base (3) of the sole (1), and of the three parts (S/1), (S/2), (S/3) of the sole determined by the internal cavity (5) and by the external cavity (5/a)

The internal (5) and external (5/a) cavities traverse the sole (Z/3), the heel (Z/1) and the plantar arch (Z/2) areas of the sole (1) dividing the sole (1) into two or more parts—three in the case illustrated in FIG. 3 represented with (S/1) (S/2) (S/3).

The three parts (S/1), (S/2), (S/3) are connected to the internal (5) and external (5/a) cavity and thus the widening of the internal (5) and external (5/a) cavity generated by the extension—in width—of the vertical elements (2) and (2/a) represented as extended elements (14) determines the moving away of the parts (S/1), (S/2), (S/3) from each other, determining the widening of the sole (1).

The internal cavity (5) and the external cavity (5/a) cover the entire surface of the sole (1) and they can be easily widened due to the fact that they are provided with vertical elements (2) and (2/a) made using extremely elastic and deformable material.

Figure 4:
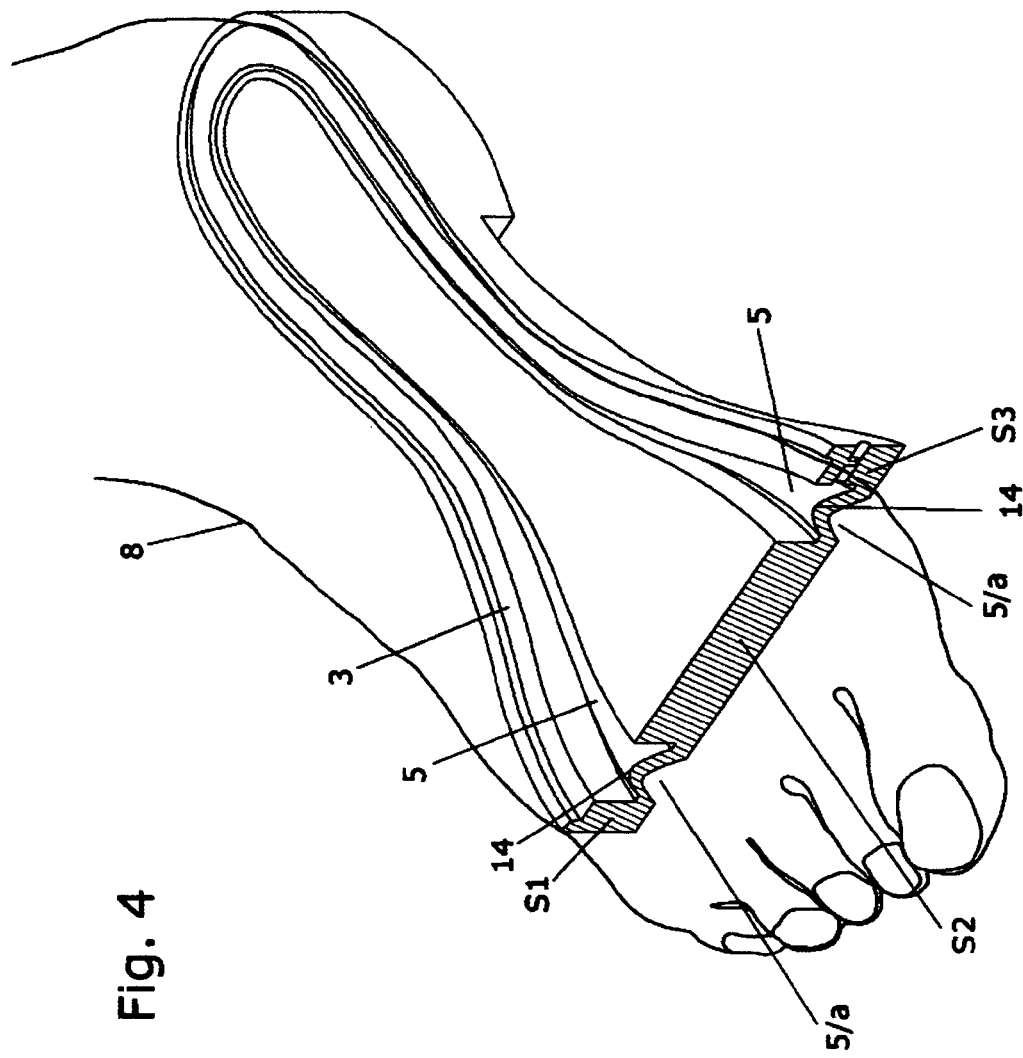
FIG. 4 is a sectional side representation of the gluing base (3) of the sole (1) showing the vertical elements (14) extended and the internal (5) and external (5/a) cavities widened due to the lateral pressure caused by the variation of the conformation of the foot (8) or by the deformation thereof.

The folded vertical elements (2) and (2/a) are automatically extended in width (14) following the lateral pressure exerted by the variation of the conformation or by the deformation, or by the swelling of the foot (8) and they generate—through the extension thereof—the widening of the internal (5) and external (5/a) cavities and the moving of the parts (S/1), (S/2), (S/3)—away from each other and horizontally—of the sole (1), as shown in FIG. 4, thus providing the user with a shoe adaptable to the different swelling of the feet (8) thereof at any time of the day.

The user, upon wearing the shoes and upon determining the width thereof according to the conformation or deformation of the feet (8) thereof through the same mechanical principles as described above and shown in FIGS. 4 and 5 may opt for permanent stabilization by injecting the foamed two-component material (A) into the widened internal cavity (5) of the sole (1) by means of a simple syringe (7) inserted into a hole (6).

Figure 5:
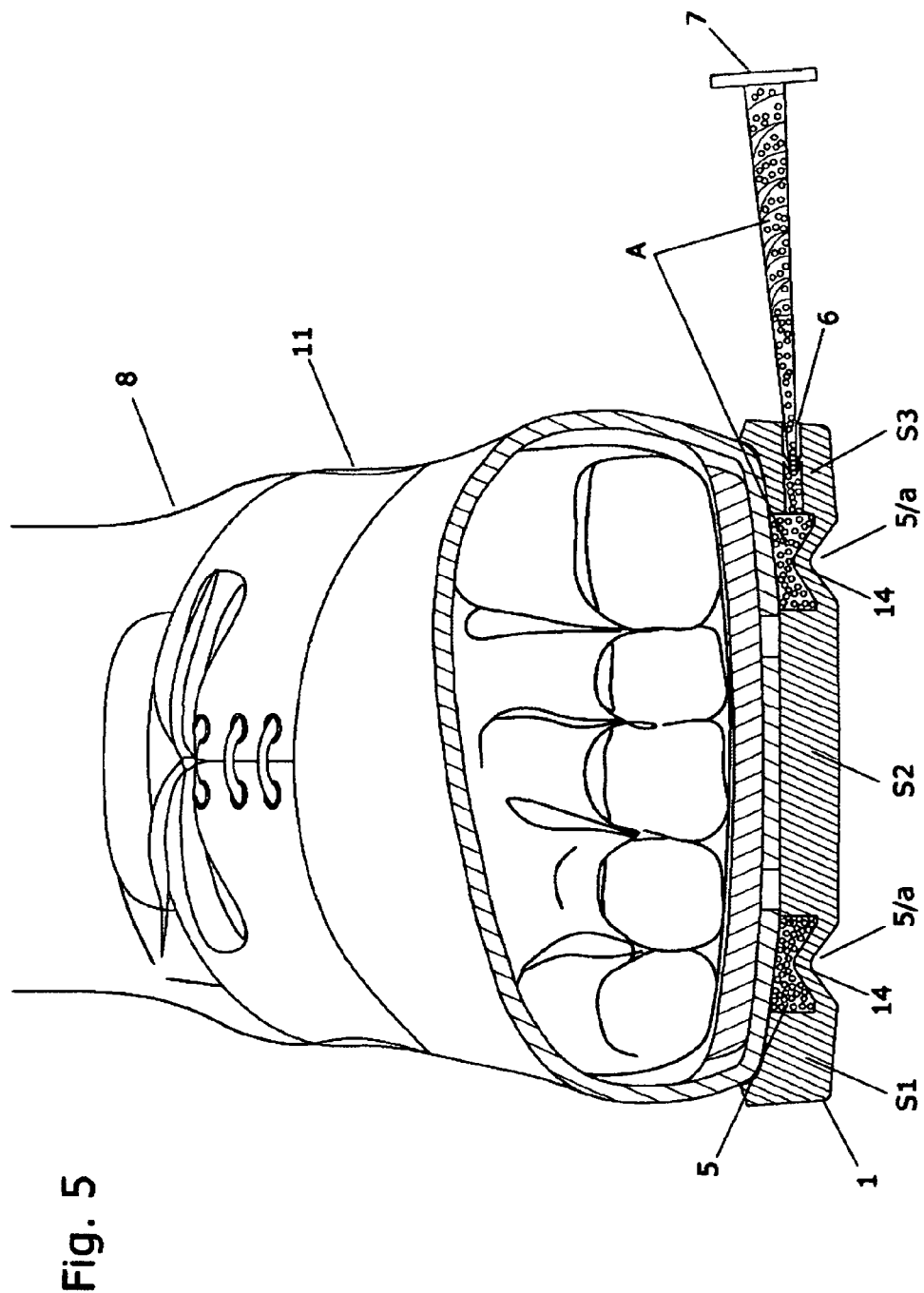
FIG. 5 is a front sectional view of the sole (1) showing the vertical elements (14) extended due to the pressure exerted by the variation of the conformation of the foot (8) caused by the daily swelling variables thereof and the widened internal cavity (5) into which the foamed two-component fluid material (A) was injected by means of a syringe (7) from the hole (6) which connects said internal cavity (5) with the external.

The foamed two-component material (A), flowing along the widened internal cavity (5), solidifies hence permanently stabilising the width of the sole (1) and of the upper (11) to the conformation or deformation of the foot, as shown in FIG. 5.

The automatic adaptation of the width of the sole (1) and of the shoe on which it is mounted provides the advantage of not altering the flexibility of the shoe in any manner whatsoever, thus making it more comfortable for the user.

In the step of gluing the sole (1) to the upper (11) having the assembly last (10) thereof, the positioning and elasticity of the vertical elements (2) folded over each other and the corresponding concave elements (2/a) allow mechanical extension thereof due to pressure with the ensuing widening of the internal (5) and external (5/a) cavity and the moving of the parts (S/1), (S/2) and (S/3) away from each other and horizontally, and the ensuing widening of the sole (1), so that the gluing base (3) of the sole adapts to the width of the upper (11) inside which the assembly last (10) is arranged, as shown in FIGS. 6 and 7.

The mechanical adaptation of the width of the sole to the different width of the assembly last (10) inserted in the upper (11) has the advantage of preventing the upper (11), after removing the assembly last (10), from being subjected to deformations.

A further advantage of the present invention lies in the fact that the shoe factories—due to the possibility of adapting the widening of the gluing base (3) of the sole (1) to the various dimensions of the assembly lasts (10) of the upper (11)—may use only one sole (1) and acquire the mould thereof alone, with considerable reduction of costs.

Installed in the hole (6) of the sole (1) is a membrane (9) having the function of protecting the internal cavity (5) against external elements before said membrane (9) is deflagrated by the syringe (7) by means of which the foamed two-component material (A) is injected.

Furthermore the adaptation of the width of the gluing base (3) of the sole (1) to the assembly last (10) and to the upper (11) in which it is inserted provides for that the upper (11) be made elastic according to known methods.

Though mainly referring to a shoe sole, what has been described and claimed shall be deemed extended at least to providing greater comfort and flexibility of the shoe mounting the sole having the technical characteristics described and claimed in the present application.

Furthermore, what has been described and illustrated in all the details and in the attached drawings as well as claimed hereinafter can be replaced with technically equivalent non-solid details having the same function, without departing from the scope of protection of the present invention patent application.

The invention claimed is:

1. A sole for shoes in which the sole formed in a single mold and of a non-rigid elastic material, the sole comprising: a first part having an upper side and a lower side; a second part having an upper side and a lower side; at least one foldable element having a concave portion defining an internal cavity with said first part and an external cavity, each of said internal cavity and said external cavity being continuous inwardly of a periphery of the sole, said internal cavity being of an upper side of the foldable element, said external cavity being at a lower side of the foldable element, the foldable element formed between said first and second parts, said concave portion extending to said upper side of said first part and to said upper side of said second part; a gluing base formed at said upper side of said first part; a hole extending through said first part so as to open to an exterior of the sole and so as to open at said internal cavity, said hole having a membrane therein, said first and second parts having a high elasticity such that the sole is mechanically extensible when pressed during gluing of the sole to an upper part of the shoe inserted into an assembly last such that a width of said gluing base adapts to a width of the assembly last, the foldable element causing a flexibility between said first part and said second part so as to automatically adapt to variations in foot shape, the internal cavity having a solidified foamed two component liquid received therein.

2. The sole of claim 1, wherein said gluing base is positioned at the upper side of the first part opposite to said external cavity, and wherein said gluing base is adjacent to an outer surface of said first part.

3. The sole of claim 1, wherein said membrane separates said internal cavity from the exterior of the sole so as to prevent external elements from entering said internal cavity.

4. The sole of claim 1, wherein said sole having the upper part is affixed thereto.

5. The sole of claim 1, wherein the concave portion is formed of a material that is of greater elasticity than an elasticity of said first part and said second part, the concave portion being deformable upon the injection of the foamed two-component liquid.

6. The sole of claim 1, wherein the foldable element extends across a heel and a plantar arch of the sole as to divide the sole into the first part and the second part.

7. The sole of claim 1, wherein the foldable element is mechanically extendable when pressed during the gluing of the sole to the upper part.

8. The sole of claim 1, wherein the foldable element is automatically extendable as a result of the lateral pressure exerted thereupon by a foot.

9. The sole of claim 4, further comprising: a syringe cooperative with said concave portion, said syringe containing the foamed two-component liquid therein, said syringe adapted to inject the foamed two-component liquid into said concave portion.

10. The sole of claim 4, wherein said foamed two-component liquid flows along the internal cavity and solidifies so as to widen the internal cavity.

* * * * *